(12) United States Patent
Xiong et al.

(10) Patent No.: US 7,871,954 B2
(45) Date of Patent: Jan. 18, 2011

(54) SYNTHESIS OF CARBON SUPPORTED PLATINUM-TUNGSTEN ELECTROCATALYSTS

(75) Inventors: Liufeng Xiong, Columbus, OH (US); Ting He, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 11/483,102

(22) Filed: Jul. 10, 2006

(65) Prior Publication Data

US 2008/0008924 A1    Jan. 10, 2008

(51) Int. Cl.
  B01J 31/00   (2006.01)
  B01J 37/00   (2006.01)
  C08F 4/02    (2006.01)
  C08F 4/60    (2006.01)

(52) U.S. Cl. .................. 502/152; 502/150; 502/102; 502/104; 502/107

(58) Field of Classification Search .................. 502/152, 502/150, 102, 104, 107
See application file for complete search history.

(56) References Cited

U.S. PATENT DOCUMENTS

| | | | |
|---|---|---|---|
| 6,939,640 B2 | 9/2005 | Kourtakis | |
| 6,967,183 B2 * | 11/2005 | Hampden-Smith et al. | 502/101 |
| 7,037,873 B2 | 5/2006 | Kato | |
| 7,060,648 B2 | 6/2006 | Christian et al. | |
| 2001/0027160 A1 | 10/2001 | Lee et al. | |
| 2006/0121332 A1 | 6/2006 | He et al. | |

FOREIGN PATENT DOCUMENTS

WO    2004/109829 A1    12/2004

OTHER PUBLICATIONS

Dickinson, A.J, Carrette, L.P.L. Collins, J.A., Friedrich, K.A., Stimming, U.; Preparation of a Pt-Ru/C catalyst from carbonyl complexes for fuel cell applications, Electrochimica Acta, vol. 47, No. 22-23, (Aug. 30, 2002) pp. 3733-3739., Elsevier Science, Barking , Great Britain.
He T., Kreidler, E., Xiong, L., Luo, J., Zhong, C.J., Alloy Electrocatylsts—Combinatorial Discovery and Nanosynthesis, J. of the Electrochemical Society, vol. 153, No. 9, (Jun. 27, 2006), pp. A1637-A1643, The Electrochemical Society.
Zhou, W.J., et al., Pt-based anode catalysts for direct fuel cells, Solid State Ionics, vol. 175, No. 1-4, (Nov. 30, 2004), pp. 797-803, North Holland Publishing Company, Amsterdam, NL.
Pattabi, M., et al., Electrochemical charaterization of tungsten carbonyl compound for oxygen reduction reaction, International Jour. of Hydrogen Energy, vol. 26, No. 2, (Feb. 2001), pp. 171-174, Elsevier Science Publishers, Barking, Great Britain.
Xiong, L., He, T., Synthesis and charaterization of carbon supported PtW catalysts from carbonyl complexes for oxygen electroreduction, Electrochemistry Commun., vol. 8, No. 10, (Oct. 2006), pp. 1671-1676, Elsevier B.V., Amsterdam, NL.
Kreidler, E., et al.; "Combinatorial Discovery of Alloy Electrocatalyst s for Oxygen Reduction"; Electrocatalysis PV11, 222, The Electrochemical Society, Pennington, NJ.
Gotz, M., et al.; "Binary and ternary anode catalyst formulations including the elements W, Sn and Mo for PEMFCs operated on methanol or reformate gas," Electrochimica Acta, vol. 43, No. 24, pp. 3637-3644 (1998), Elsevier Science, Ltd.
Zhou, W., et al.; "Pt based anode catalyst for direct ethanol fuel cells," Applied Catalysis B: Environmental, vol. 46, pp. 273-285 (2003), Elsevier B.V.
Arico, A.S., et al.; "Investigation of a carbon-supported quaternary Pt-Ru-Sn-W catalyst for direct methanol fuel cells," J. Power Sources, vol. 55, pp. 159-166 (1995); Elsevier Science S.A.
Lee, S., et al.; "Nanoparticle Synthesis and Electrocatalytic Activity of Pt Alloys for Direct Methanol Fuel Cells," J. Electrochemical Soc., vol. 149, No. 10, pp. A1299-A12304 (2002), The Electrochemical Society, Inc.
Goetz, M., et al.; "Composite electrocatalysts for anodic methanol and methanol-reformate oxidation," J. Applied Electrochemistry, vol. 31, pp. 811-17, (2001), Kluwer Academic Publishers.
Shao, C., et al.; "Selective methanol synthesis from CO2/H2 on new SiO2-supported PtW and PtCr bimetallic catalysts," Applied Catalysis A: General, vol. 128, L1-L6 (1995), Elsevier Science B. V.
Alexeev, O., et al., "MgO-Supported Platinum-Tungsten Catalysts Prepared from Organometallic Precursors: Platinum Clusters Isolated on Dispersed Tungsten," J. Catalysis, vol. 164, pp. 1-15 (1996), Academic Press.

* cited by examiner

*Primary Examiner*—Jerry Lorengo
*Assistant Examiner*—James E McDonough
(74) *Attorney, Agent, or Firm*—Capitol City TechLaw, PLLC; Mark E. Duell

(57) ABSTRACT

The present teachings are directed toward methods of producing electrocatalyst compositions of platinum and tungsten through the thermal decomposition of carbonyl-containing complexes of the two metals.

11 Claims, 10 Drawing Sheets

SYNTHESIS OF CARBON SUPPORTED PLATINUM-TUNGSTEN ELECTROCATALYSTS

BACKGROUND

1. Field of the Invention

The present teachings relate to a method of preparing electrocatalyst compositions containing platinum and tungsten by thermally decomposing carbonyl complexes of the two metals.

2. Discussion of the Related Art

The desire to reduce the amount of expensive platinum group metals needed to obtain a desired level of performance for an electrocatalyst is an ever present operational parameter for the design of many devices and procedures involving electrocatalysts.

Enhancement of catalytic performance by combining platinum with various less expensive metals is one of the possible avenues to reduce the amount of platinum required, or increase the efficiency of the catalyzed reaction, or both. One application of interest for Pt-based electrocatalyst is, for instance, the cathode reaction of a typical proton exchange membrane fuel cell ("PEMFC") which can utilize an electrode containing a Pt-based electrocatalyst to catalyze the oxygen reduction reaction ("ORR").

Proton exchange membrane fuel cells are promising power sources for transportation, portable and stationary applications. The sluggish kinetics of ORR at the cathode and the high cost of platinum electrocatalysts are just some of major challenges that impede the commercialization of PEMFCs. Various studies have found that platinum alloys to have higher electrocatalytic activities compared to the standard platinum on carbon formulation. See, for instance B. C. Beard, P. N. Ross, *J. Electrochem. Soc.* 130 (1990) p. 3368; S. Muketjee, S. Srinivasan, *J. Electroanal. Chem.* 357 (1993) p. 201; M. Watanabe, K. Tsurumi, T. Mizukami, T. Nakamura, P. Stonehart, *J. Electrochem. Soc.* 141 (1994) p. 2659; A. S. Arico, A. K. Shukla, H. Kim, S. Park, M. Min, V. Antonucci, *Appl. Surf. Sci.* 172 (2001) p. 33; E. Antolini, R. R. Passos, E. A. Ticianelli, *Electrochim. Acta* 48 (2002) p. 263; U. A. Paulus, A. Wokaun, G. G. Scherer, T. J. Schmidt, V. Stamenkovic, N. M. Markovic, P. N. Ross, *Electrochim. Acta* 47 (2002) p. 3787; L. Xiong, A. Manthiram, *J. Mater. Chem.* 14 (2004) p. 1454; L. Xiong, A. Manthiram, *J. Electrochem. Soc.* 152 (2005) p. A697; E. Kreidler, L. Minor, L. Xiong, T. He, *Electrocatalysis* (Eds. G. Brisard, R. Adzic, V. Birss and A. Wieckowski, The Electrochemical Society, Pennington, N.J.) PV11 (2005) p. 222; and J. Luo, N. Kariuki, L. Han, L. Wang, C. J. Zhong, T. He, *Electrochim. Acta* 51 (2006) p. 4821.

However, recent studies have reported on the instability of platinum alloy electrocatalysts under PEMFC operating conditions. See, for instance, T. R. Ralph, M. P. Hogarth, *Platinum Met. Rev.* 46 (2002) p. 3 and J. Xie, D. L. Wood III, D. M. Wayne, T. A. Zawodzinski, P. Atanassov, R. L. Borup, *J. Electrochem. Soc.* 152 (2005) p. A104.

The observed instabilities of these alloys has been attributed to the dissolution of 3d transition metals in the platinum alloys, with some cases reported of diffusion into the membrane or even migration to the anode. Therefore, the stability issue of the electrocatalyst formulation has been a major concern for their application as electrodes in PEMFC.

Carbon supported PtW alloys have been reported, but only as the anode electrocatalysts for PEMFC operated on methanol, ethanol, or reformate gases. See, for example, M. Götz, H. Wendt, *Electrochim. Acta* 43 (1998) p. 3637; W. Zhou, Z. Zhou, S. Song, W. Li, G. Sun, P. Tsiakaras, Q. Xin, *Appl. Catal. B* 46 (2003) p. 273; A. S. Aricò, A. Poltarzewski, H. Kim, A. Morana, N. Giordano, V. Antonucci, *J. Power Sources* 55 (1995) p. 159; S.-A. Lee, K.-W. Park, J.-H. Choi, B.-K. Kwon, Y.-E Sung, *J. Electrochem. Soc.*, 149 (2002) p. A1299, and M. Goetz, H. Wendt, *J. Appl. Electrochem.* 31 (2001) p. 811.

Carbon supported platinum tungsten alloy nanoparticles have been prepared by impregnation or chemical co-reduction of chloroplatinic acid and ammonium tungstates. See the M. Gotz and W. Zhou references listed above. Drawbacks to those processes include the inability to control particle size and compositional homogeneity, and difficulty in reducing tungsten to the metallic state.

A need exists for methods of producing supported platinum tungsten containing electrocatalysts that reduce the amount of platinum needed to achieve a desired performance level.

SUMMARY

The present teachings satisfy the need for stable electrocatalyst compositions of platinum alloys, particularly for fuel cell electrocatalysts, especially as the cathode to catalyze the oxygen reduction reaction, and methods of preparing the platinum tungsten alloy compositions.

A method for preparing a supported platinum and tungsten containing composition is taught by the present disclosure. The method includes the steps of providing a platinum-containing carbonyl complex and a tungsten-containing carbonyl complex. Then first contacting the platinum-containing carbonyl complex and the tungsten-containing carbonyl complex to form a platinum and tungsten-containing complex; and then second contacting the platinum and tungsten-containing complex with a support material to prepare a supported platinum and tungsten containing composition.

The present disclosure also teaches an electrocatalyst comprising a metal composition including platinum and tungsten, where the platinum is derived from a platinum carbonyl complex and the tungsten is derived from a tungsten carbonyl complex. The platinum carbonyl complex and the tungsten carbonyl complex are contacted together to form a mixture, a support material is added to the mixture, and the mixture and the support material are then heated to form a platinum and tungsten-containing composition.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
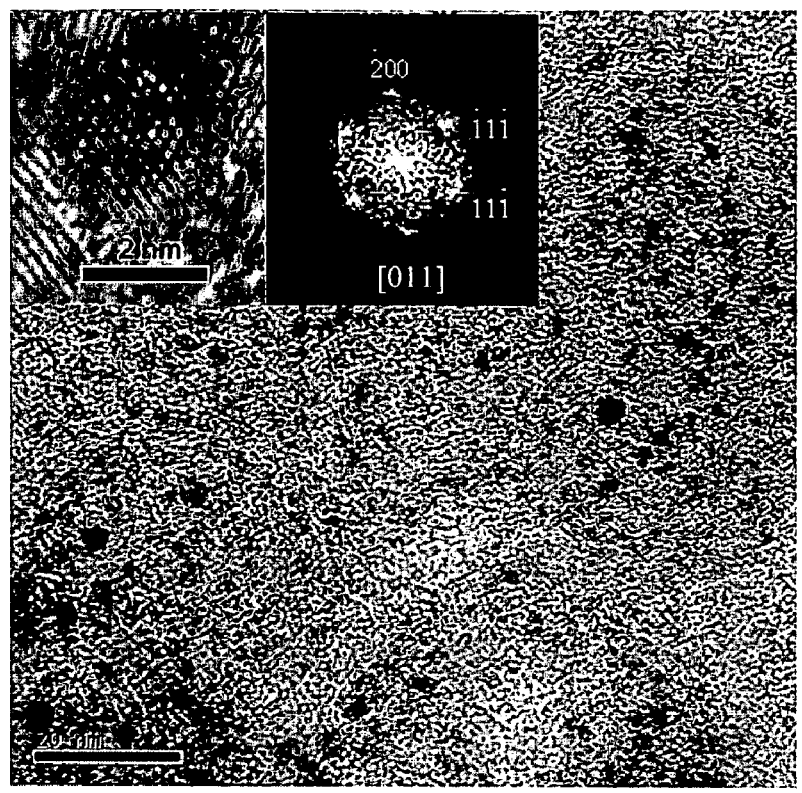
FIG. 1*a-b* illustrate the HRTEM micrographs and particle size distribution of a carbon supported PtW composition.
Figure 1:
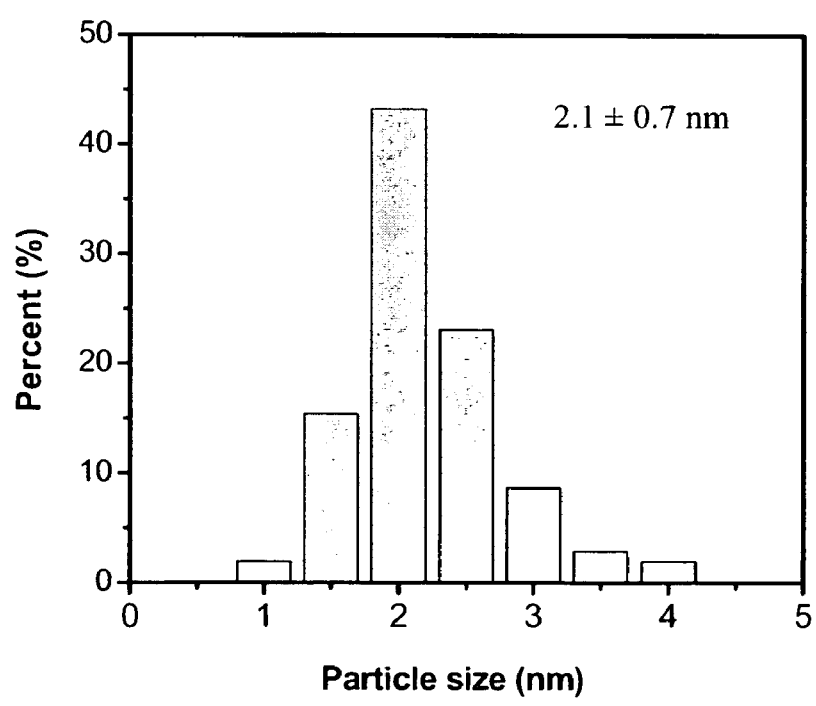

The present teachings relate to a method for preparing a supported platinum and tungsten containing composition. The method includes providing a platinum-containing carbonyl complex and a tungsten-containing carbonyl complex. The two complexes are then contacted together to form a platinum and tungsten-containing complex. The platinum and tungsten-containing complex is then contacted with a suitable support material to form a supported platinum and tungsten containing composition.

The tungsten-containing carbonyl complex can preferably be commercially available tungsten hexacarbonyl, although other carbonyl-containing tungsten precursors can also be utilized in the present method.

The platinum-containing carbonyl complex can be synthesized by dissolving chloroplatinic acid in either an aqueous or organic solvent and then purging the solution with CO. Purging can continue until the solution changes color from an initial orange to either cherry red in aqueous solvent to dark green in tetrahydrofuran, usually about 24 hours. This process is a modification of a known synthesis reported by A. J. Dickinson, et al. in *Electrochim. Acta*, Vol. 47, p. 3733, 2002.

According to the present method, the step of contacting the platinum-containing carbonyl complex and the tungsten-containing carbonyl complex includes mixing the two carbonyl complexes in an organic solvent. The organic solvent can include at least one element selected from the group consisting of alcohol, methanol, ethanol and tetrahydrofuran. During the step of contacting the two carbonyl containing complexes together, the reaction solution can be continuously purged with CO gas.

Support material suitable for the various embodiments of the present teachings include at least one element selected from the group consisting of a high surface area carbon black, an alumina support material and a zirconia support material. High surface area refers to supports with surface areas of at least about 100 $m^2/g$. Specific examples of a suitable high surface area carbon black can include commercially available support material, such as, Vulcan XC-72R manufactured by Cabot Corporation, Billerica, Mass., and Carbon EC-P manufactured by Ketjen Black International Company, Tokyo, Japan.

After combining the platinum and tungsten complexes with the support material the resulting combination can be heated to a temperature ranging from about 500 C to about 800 C. Preferably, the combination is heated to a temperature of about 700 C. The temperature should be sufficient to produce an alloy of platinum and tungsten.

According to the present method, the supported platinum and tungsten alloy composition after heating comprises particles with sizes ranging between about 1 and about 4 nanometers. Preferably, the platinum and tungsten containing particles have average particle sizes ranging between about 1.4 and about 2.8 nanometers.

The present method can be utilized to produce platinum and tungsten alloy compositions with varying ratios of platinum and tungsten. The supported composition can include platinum present in an atomic percentage ranging between about 20 percent and about 95 percent and tungsten present in an atomic percentage ranging between about 5 percent and about 80 percent. Preferably, the method can be utilized to produce a supported composition including platinum present in an atomic percentage ranging between about 30 percent and about 45 percent and tungsten present in an atomic percentage ranging between about 55 percent and about 70 percent.

The supported composition produced by the present method can be utilized as an electrocatalyst in various devices. One embodiment can be the supported composition utilized as the cathode of a fuel cell.

Another embodiment of the present teachings includes an electrocatalyst including a metal composition including platinum and tungsten, with the platinum being derived from a platinum carbonyl complex and the tungsten being derived from a tungsten carbonyl complex. The platinum carbonyl complex and the tungsten carbonyl complex can be contacted together to form a mixture, a support material can be added to the mixture, and the mixture and the support material can be heated to form a platinum and tungsten-containing composition.

The electrocatalyst according to the present teachings can include tungsten derived from tungsten hexacarbonyl. The electrocatalyst can be prepared by having the platinum carbonyl complex and the tungsten carbonyl complex contacted together in an organic solvent. The organic solvent can include at least one element selected from the group consisting of alcohol, methanol, ethanol and tetrahydrofuran.

In the present teachings, the support material can include at least one element selected from the group consisting of a high surface area carbon black, an alumina support material and a zirconia support material. High surface area refers to supports with surface areas of at least about 100 $m^2/g$.

The process of heating the metals mixture and the support material, according to the present teachings, can include heating the metals mixture and the support material to a temperature ranging from about 500 C to about 800 C. Preferably, the metals mixture and the support material are heated to a temperature of about 700 C.

The presently taught electrocatalyst composition can have particles with average particle sizes ranging between about 1 and about 4 nanometers. Preferably, for some embodiments, the electrocatalyst composition includes particles with average particle sizes ranging between about 1.4 and about 2.8 nanometers.

The electrocatalyst composition can include a wide range of platinum and tungsten ratios including having platinum present in an atomic percentage ranging between about 20 percent and about 95 percent and having tungsten present in an atomic percentage ranging between about 5 percent and about 80 percent. Another embodiment of the present electrocatalyst composition can have the platinum present in an atomic percentage ranging between about 30 percent and about 45 percent and the tungsten present in an atomic percentage ranging between about 55 percent and about 70 percent.

Figure 2:
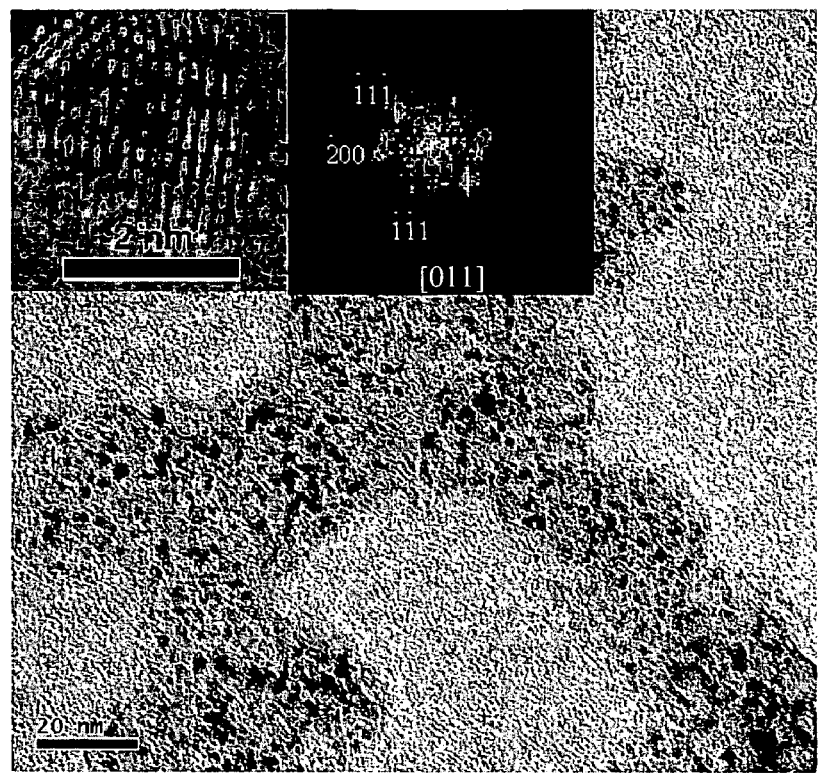
FIG. 2*a-b* illustrates the HRTEM micrographs and particle size distribution of a carbon supported PtW composition.
Figure 2:
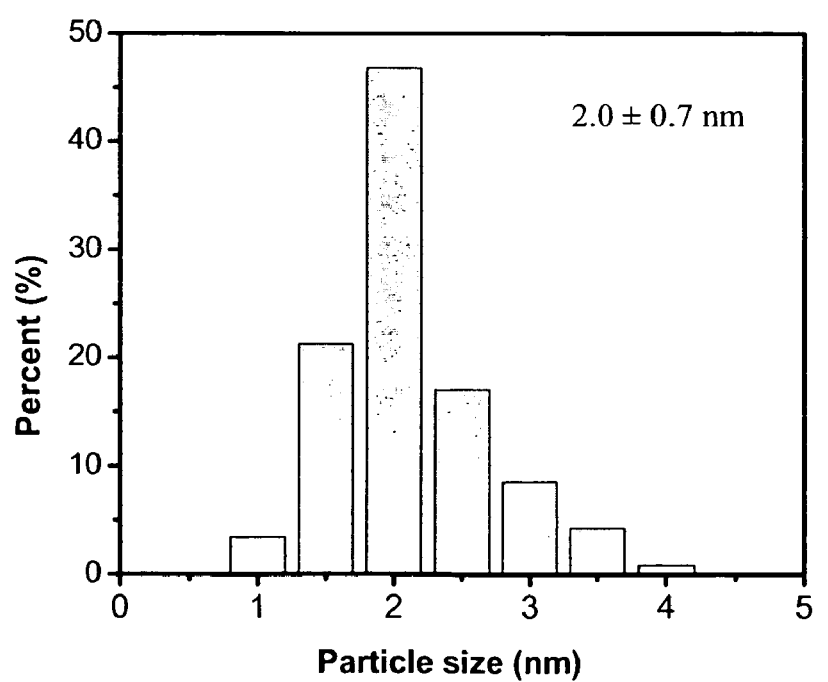

Carbon supported PtW alloy nanoparticles were prepared, at two different Pt:W ratios, with the platinum carbonyl precursor prepared in both THF (Pt:W=43:57) and aqueous solutions (Pt:W=46:54), using the methods set forth in Example 1 and 3, respectively. The composition was heat treated at 700° C. for 2 hours under a $H_2/N_2$ (1:10 v/v) atmosphere. FIGS. 1 and 2 present representative sets of HRTEM micrographs and particle distributions. The interface between PtW nanoparticles (dark spots), carbon support (dark grey area) and carbon coated TEM grid (grey background) can be clearly observed.

PtW nanoparticles have predominantly spherical shapes and are uniformly dispersed on the carbon support. Lattice fringes observed at higher magnification, see the inserts in FIG. 1a and 2a, indicate that the alloy nanoparticles are well-crystallized. Analysis of the respective FFT image, inserts in FIG. 1a and 2a, indicates that these nanoparticles have face centered cubic ("fcc")structures; confirmed by XRD results not shown. Particle size distributions in FIGS. 1b and 2b were obtained by analyzing 150 nanoparticles from the TEM micrographs of FIGS. 1a and 2a. PtW nanoparticles, with the platinum carbonyl precursor prepared in either THF or aqueous solution, show very similar size (about 2 nm) and distribution. The results indicate that the carbonyl route adopted here is very effective to synthesize small and uniform dispersed PtW alloy nanoparticles.

Figure 3:
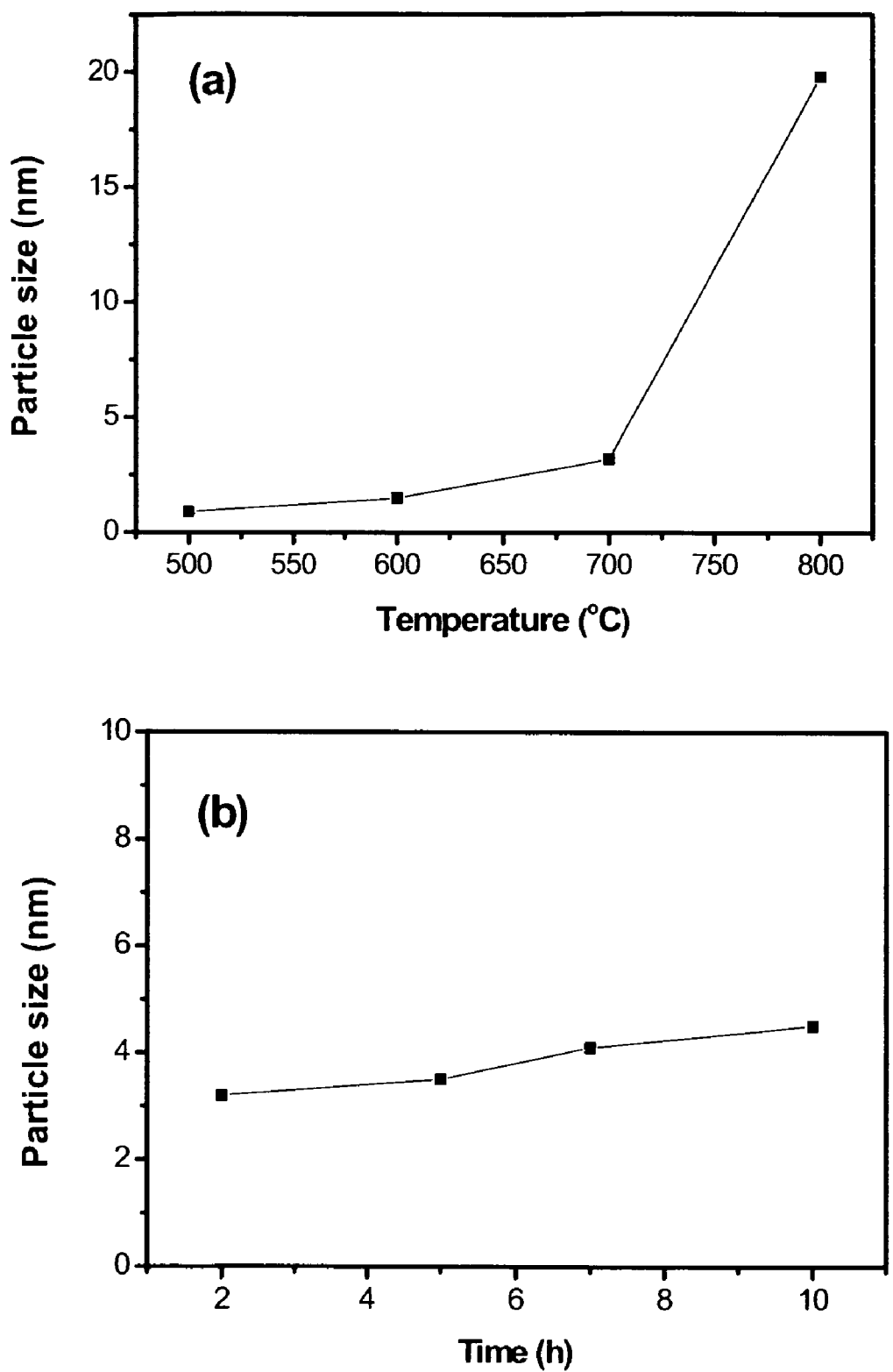
FIG. 3*a-c* illustrate the effect of synthesis parameters.
Figure 3:
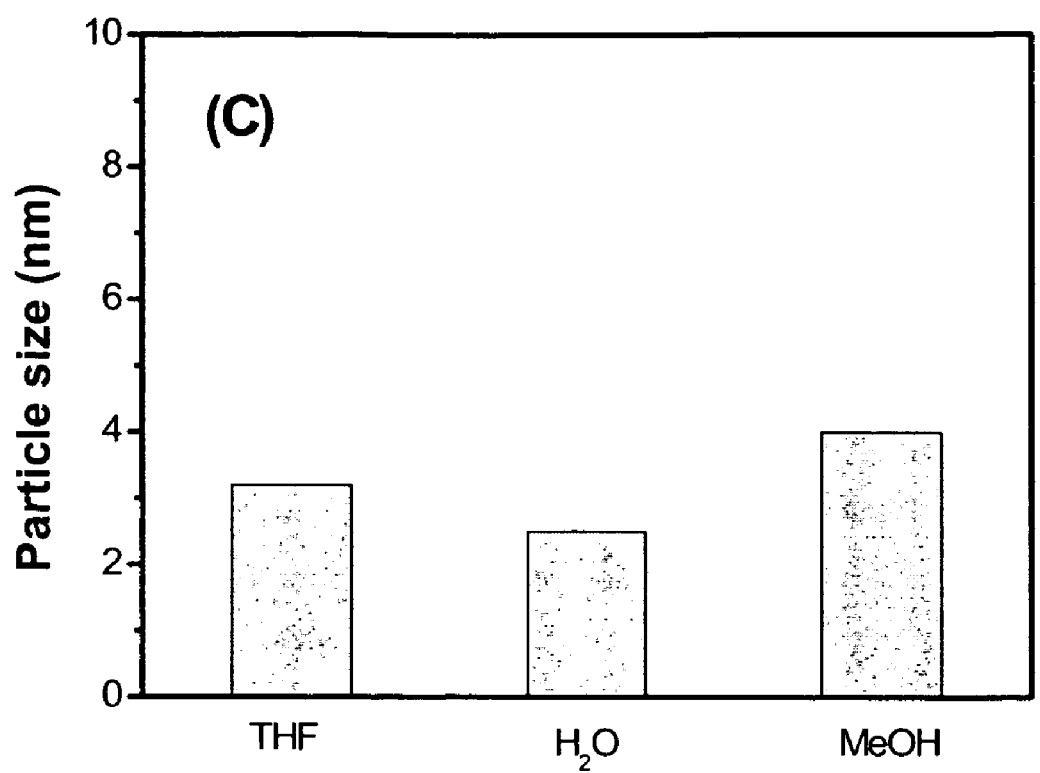

Following the procedures set forth in Examples 1 through 3 above, a study was performed to investigate the influence of synthesis parameters on particle size. FIGS. 3a, 3b and 3c depict, respectively, the particle size as functions of temperature, duration of heat treatment, and solvent. As seen in FIG. 3a, the particle size increases gradually with the temperature from 500° C. to 700° C.; further increasing the temperature, for example, to 800° C., leads to a rapid particle growth. As seen in FIG. 3b, an increase in heat treatment time from 2 hours to 10 hours at 700° C. causes the particles to grow only gradually. This small change indicates that heat treatment duration at this temperature does not influence particle size significantly. Similarly, as shown in FIG. 3c, the solvent used for preparing the PtW alloys does not significantly influence the alloy particle size.

Figure 4:
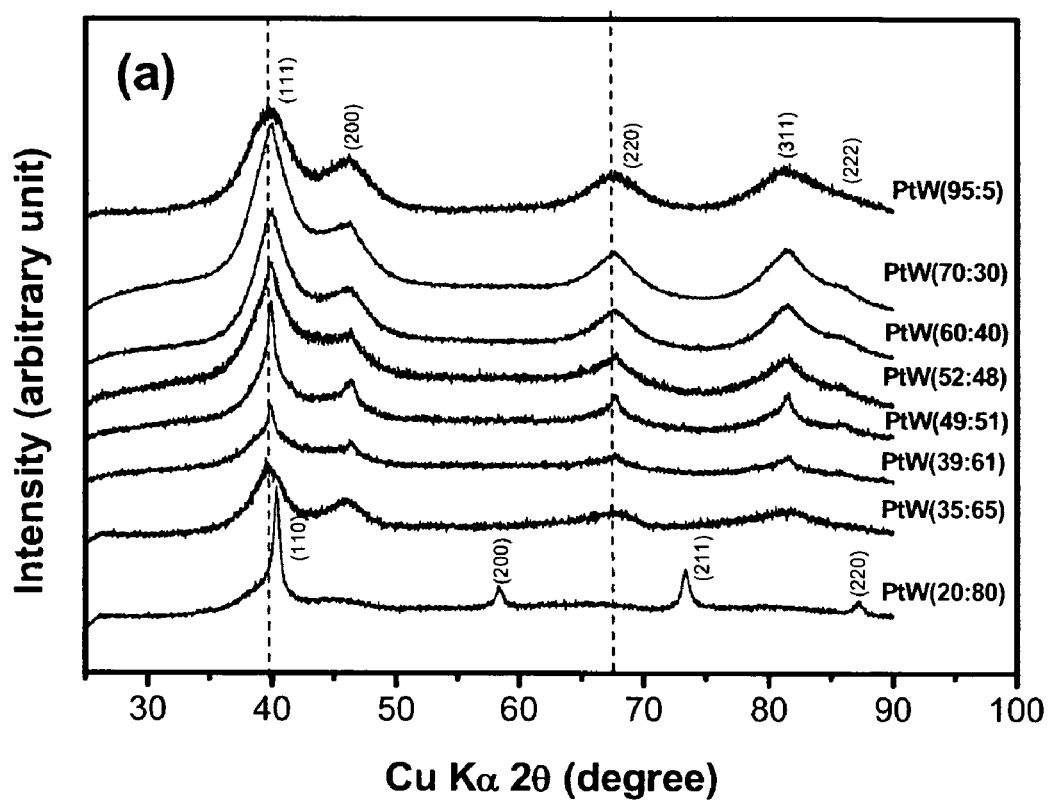
FIG. 4 illustrates the XRD patterns of carbon supported PtW compositions with varying Pt:W ratios.

A study of the effect of the Pt:W ratio on the phase of PtW alloy was conducted using eight different compositions prepared according to the method of Example 1. FIG. 4 shows the XRD patterns for the PtW compositions. The PtW alloys with W concentration up to about 65 atomic % still display the fcc type structure. Further increases in the W concentration to about 80% leads to a phase segregation as evidenced by the predominant α-W peaks (bcc structure) in addition to broadened fcc peaks.

Figure 5:
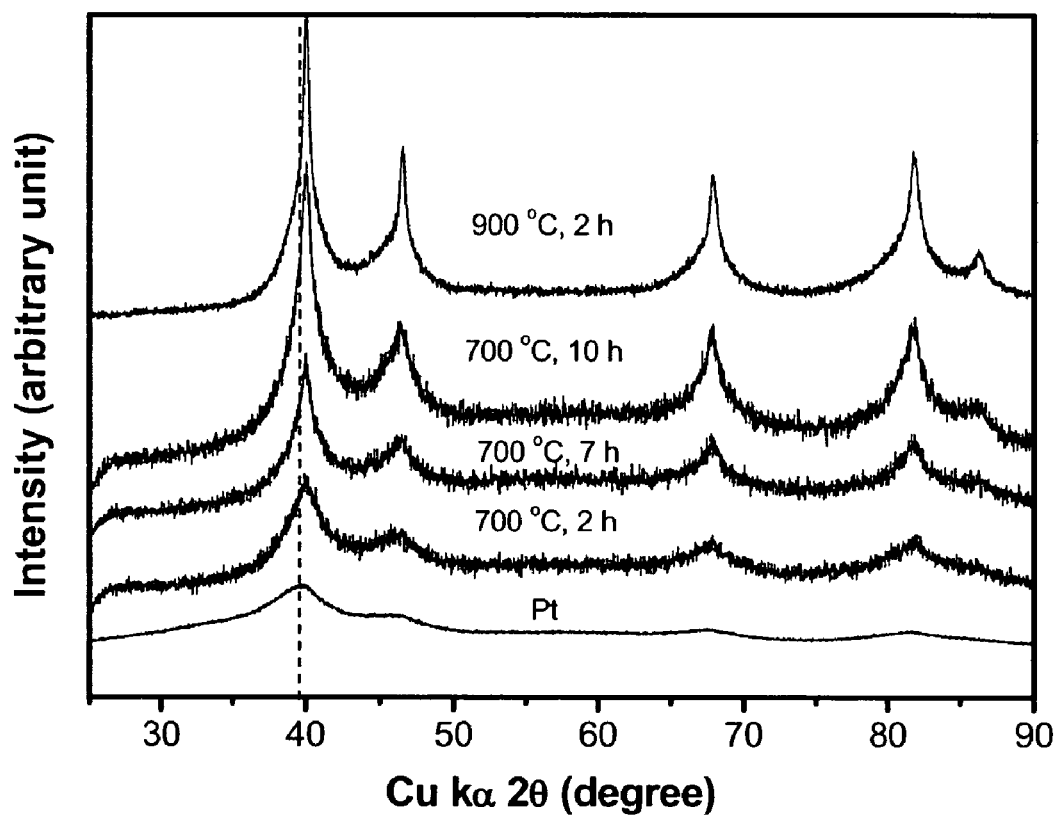
FIG. 5 illustrates the XRD patterns of carbon supported PtW compositions heat treated under differing conditions.

To further verify the structure of PtW within a particular composition range, PtW (43:57) alloy nanoparticles were heat treated at 700° C. and 900° C. for varying times under a 1:5 v/v ratio $H_2/N_2$ atmosphere. FIG. 5 displays the XRD patterns of these examples. No distinctive W phase was observed in the pattern indicating that majority of the tungsten were alloyed with platinum, at least within the detection limitation of XRD.

Figure 6:
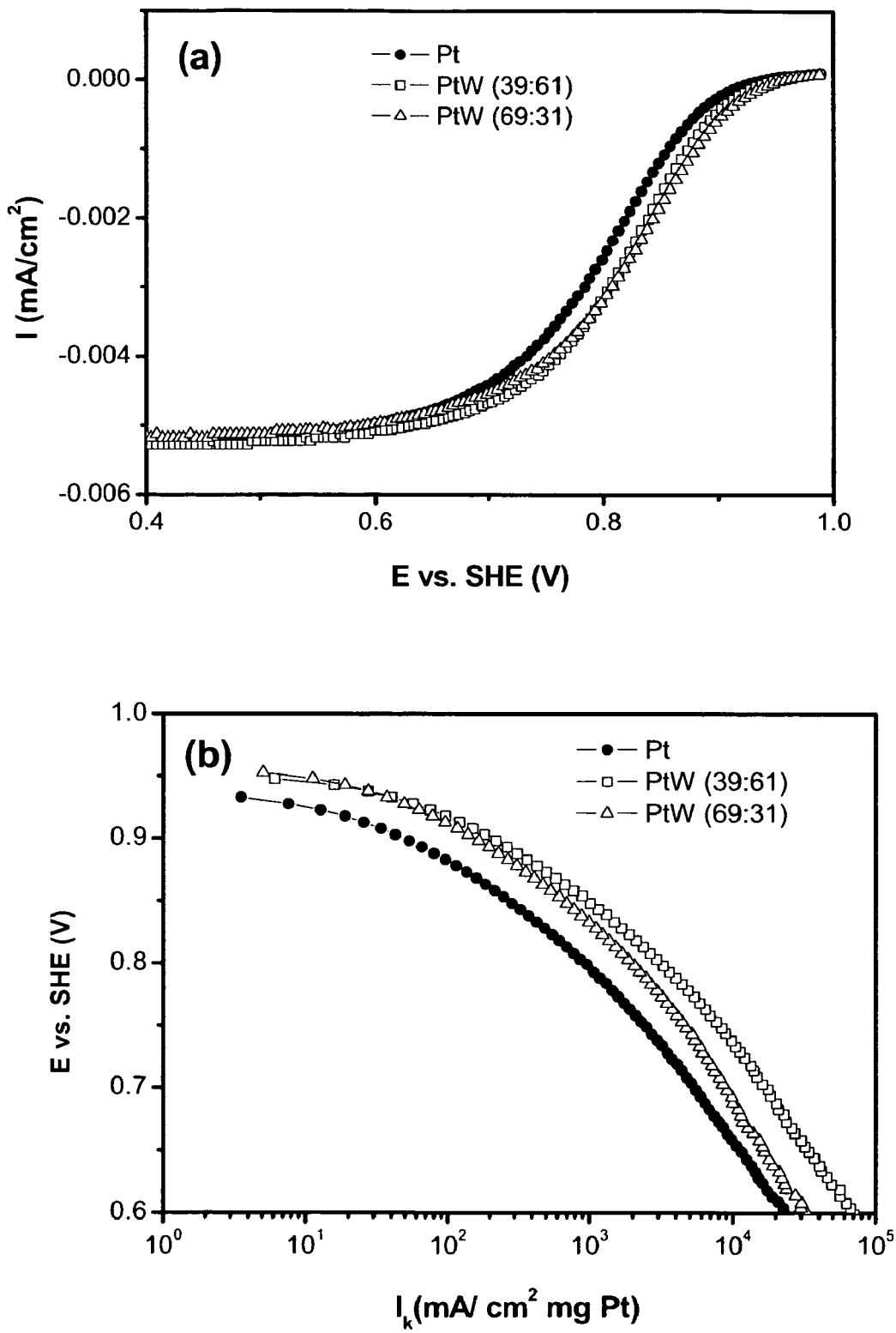
FIG. 6*a-b* illustrate the polarization curves and Tafel plots for carbon supported PtW compositions versus a benchmark Pt/C catalyst.

The electrocatalytic activity of the PtW composition according to the present teachings was analyzed by the hydrodynamic rotating disk electrode technique in 0.5 M $H_2SO_4$. FIG. 6a displays a representative set of hydrodynamic polarization curves under rotation speed of 2000 rpm. Higher catalytic activities towards molecular oxygen reduction are evidenced by the positive shift of these polarization curves for PtW alloys in comparison with benchmark Pt/C catalyst (36.4 wt %). For quantitative comparisons, Tafel plots were created using the Levich-Koutecky equation for Pt/C and PtW/C, FIG. 6b. The mass specific activity was defined as the kinetic current density (electrode geometric area) normalized by the mass of platinum. Activity enhancement was observed over the measured potential range.

Figure 7:
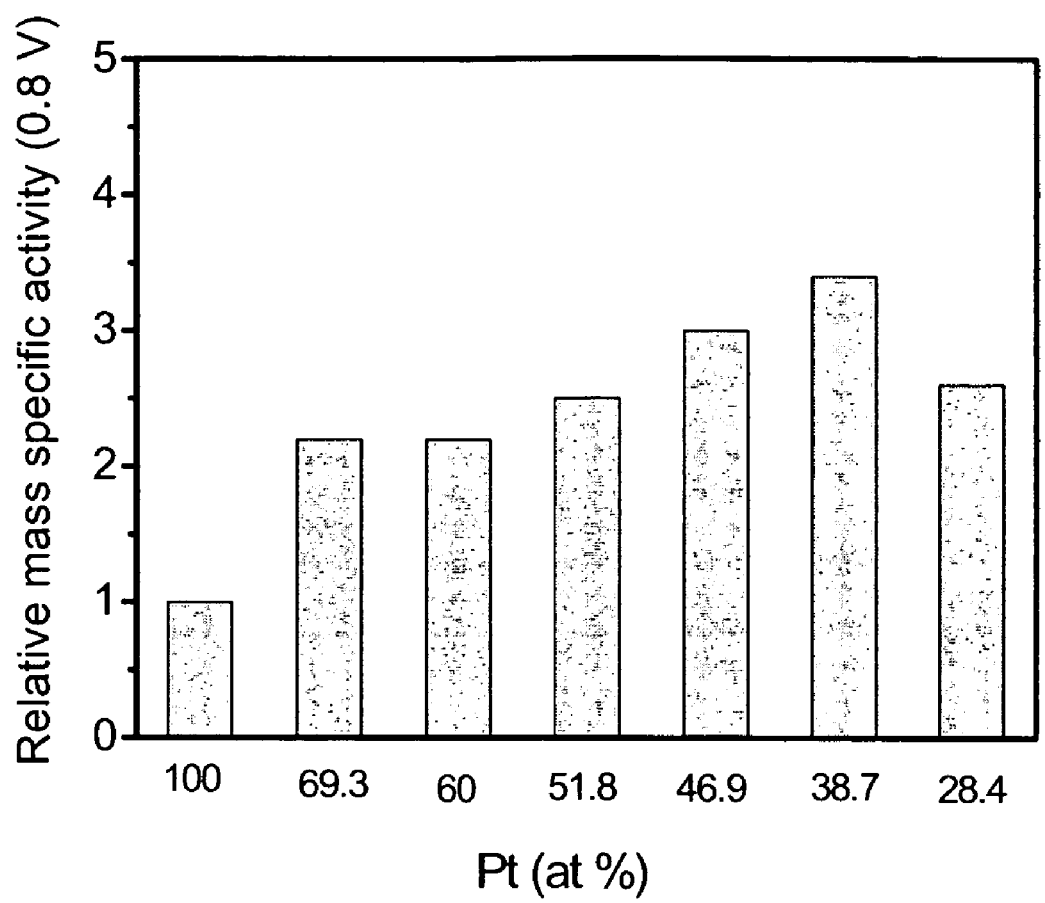
FIG. 7 illustrates the effect of Pt concentration on relative mass specific activity for carbon supported PtW compositions.

FIG. 7 presents the relative mass specific activity at 0.8 V as a function of platinum atomic concentration for various PtW compositions according to the present teachings. The PtW composition plays an important role on the electrocatalytic activity of PtW alloys. The maximum mass specific activity of PtW alloys was achieved for a platinum concentration around 38.7 atomic %, where about 3.4 times enhancement in catalytic activity has been achieved.

Figure 8:
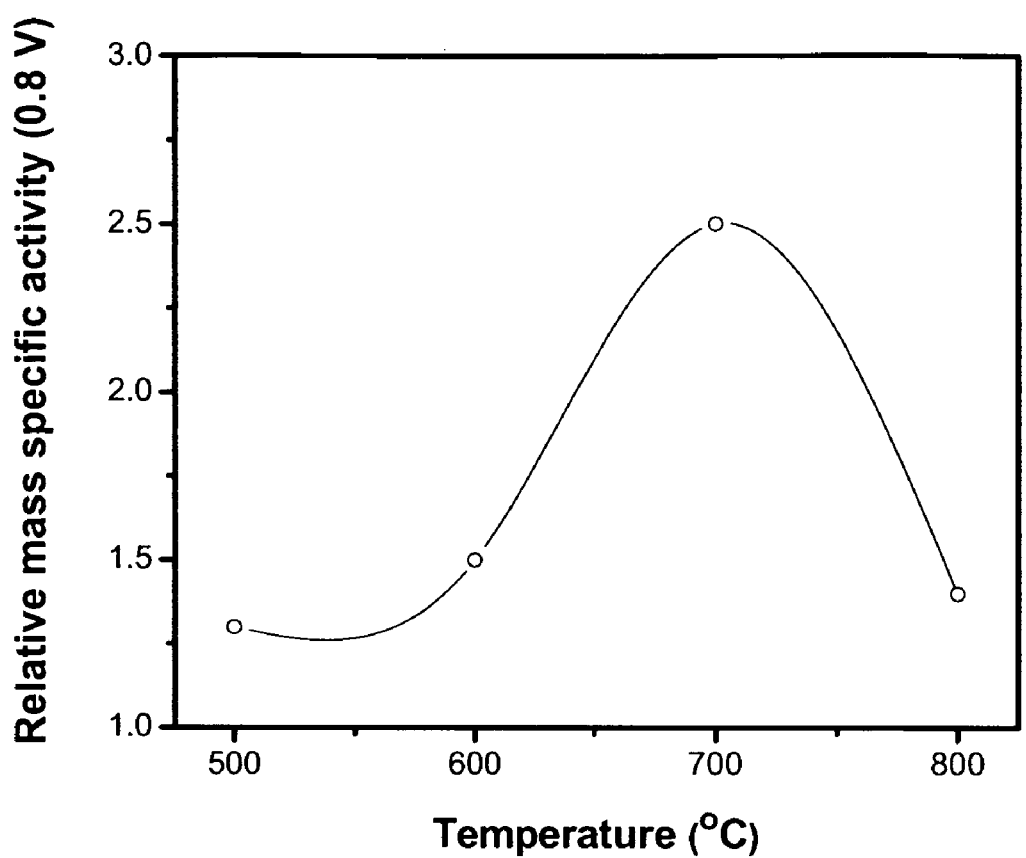
FIG. 8 illustrates the effect of heat treatment temperature on relative mass specific activity.

FIG. 8 shows the effect of temperature on the relative mass specific activity of PtW/C electrocatalysts according to the present teachings. A maximum activity was found for a temperature of around 700° C.

Figure 9:
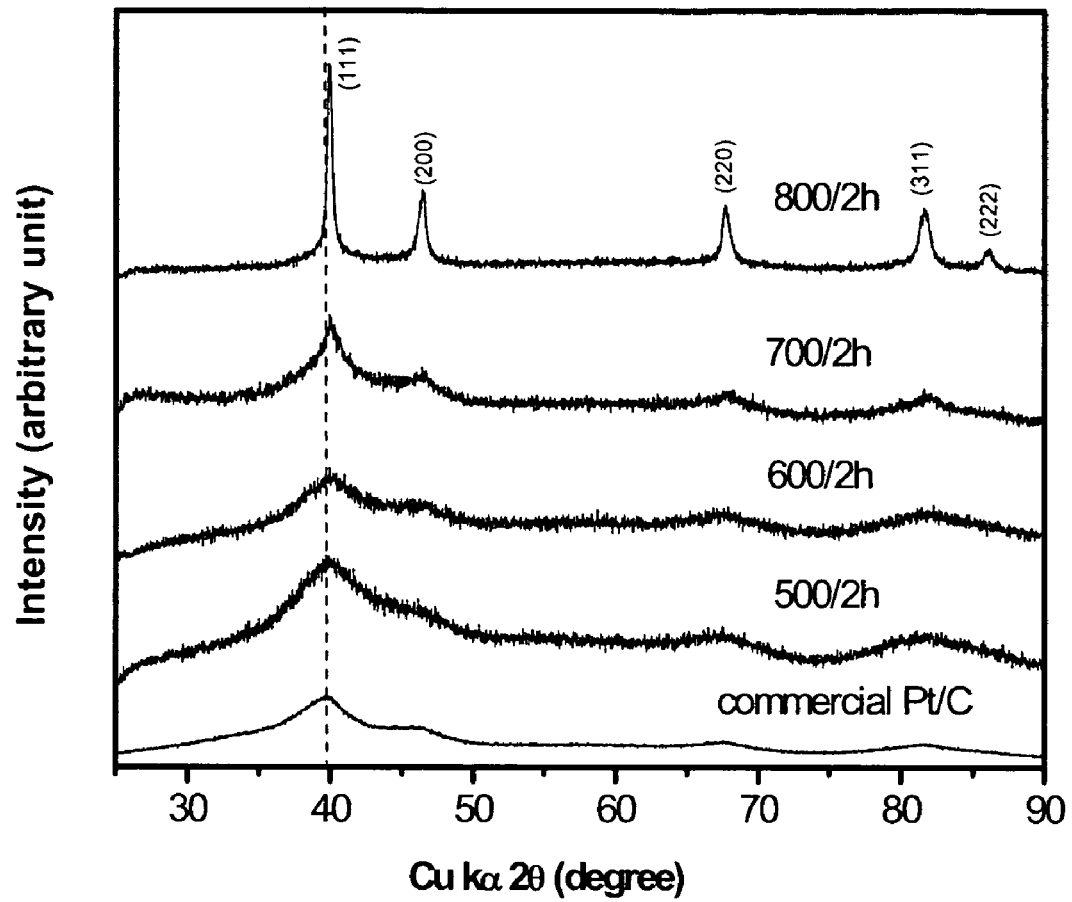
FIG. 9 illustrates the XRD patterns for carbon supported PtW composition heat treated at different temperatures.

The formation of PtW alloy is evidenced by the shift of XRD peaks at high temperatures, for example, greater than 500° C, FIG. 9. On the other hand, rapid particle size growth resulted from high temperature treatment, for instance, 800° C., see FIG. 3a, and leads to significant loss of electrochemical surface area and hence decreases the catalytic activity.

The effects of temperature on the formation of PtW alloys and particle size according to the present disclosure were also studied. FIG. 9 shows the XRD patterns of carbon supported PtW (52:48) alloy nanoparticles following heat treatment between 500 and 800° C. The XRD patterns of these alloys largely maintain the Pt fcc structure and, hence, the reflection peaks can be assigned to the (111), (200), (220), (311) and (222) planes, respectively. Note that the peak positions shift to higher angles for samples heated at high temperatures. This shift indicates a lattice change caused by the formation of PtW alloy at high temperatures. See S.-A. Lee, K.-W. Park, J.-H. Choi, B.-K. Kwon, Y.-E. Sung, *J. Electrochem. Soc.,* 149 (2002) p. A1299. In addition, the broader diffraction peaks observed in the XRD patterns for temperatures less than 800° C. indicate that the particles are small; whereas the sharp diffraction peaks at higher temperatures, such as 800° C., indicate a rapid growth of the particles.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Example 1

A platinum carbonyl complex was prepared by modifying the reported previously procedure of A. J. Dickinson, et al. in *Electrochim. Acta*, Vol. 47, p. 3733, 2002. Chloroplatinic acid was dissolved in THF. The solution was purged with CO (50 cc/min) for 24 hours with constant stirring. The color of the solution slowly changed from orange to dark green during the CO purging. At the end of 24 hours, a dark colored solution was obtained.

Tungsten hexacarbonyl (Aldrich) was dissolved in THF and added to the THF solution of the previously prepared Pt carbonyl complex with constant stirring. The resultant mixture was further purged with CO for another 2 hours.

An appropriate amount of high surface area carbon black, dispersed in THF, was added to the above mixture. The total metal loading, platinum and tungsten combined, on the carbon support was maintained at about 40 wt %. The final mixture was slowly dried by blowing CO and $N_2$ across the surface of the solution with constant stirring overnight. The dried powder was then collected, loaded in a ceramic boat and heated at temperatures ranging from 500 to 800° C. for 2 hours under a $H_2/N_2$ mixture (1:10 v/v). The powders were collected for subsequent characterization and performance analysis.

Example 2

Same reaction conditions as Example 1, except that methanol was used in place of THF.

Example 3

Same reaction conditions as Example 1, except that the platinum carbonyl precursor was synthesized in water.

Analysis and Characterization

Samples of the above prepared PtW alloy nanoparticles were characterized by X-ray diffraction (XRD) using a Bruker powder diffractometer, a combination of a model D8 Discover and a model D8 Advance, equipped with a Ge(Li) solid state detector (Cu Kα radiation). The diffraction pattern was recorded from 2θ=25 to 90° at a scan rate of 0.02° per step and 5 s per point. The average particle size was estimated from diffraction peak broadening using Scherrer's equation.

The morphology and size of the composition were examined by high-resolution transmission electron microscopy (HRTEM) with a FEI Tecnai TF-20 microscope. The samples for HRTEM analysis were prepared by dispersing the composition in methanol and drop-casting onto a carbon coated copper grid followed by dying in air at room temperature.

The compositional analysis of the PtW alloys was carried out using an energy dispersive X-ray spectroscopy (EDX) attached to a Scanning Electron Microscopy (Hitachi 3000). The thermal properties of the carbonyl containing precursors and the metal loadings were determined by TGA-DSC using a TA Instrument Model SDT 2960 Simultaneous DSC-TGA. The samples were heated at a rate of 20° C./min. Nitrogen was used for the carbonyl thermal analysis and air was used for metal loading determination.

Electrochemical Performance Analysis

Electrochemical analyses were carried out in 0.5 M $H_2SO_4$ solution in a conventional three-electrode system, with platinum mesh as the counter electrode, SCE as the reference electrode, and a rotating disc electrode (RDE) was used as the working electrode. The working electrode was prepared by pipetting and uniformly distributing catalyst ink over the RDE tip surface and air dried overnight. The catalyst ink was prepared by mixing 20 mg supported catalysts, 20 ml Milli-Q water, and 1 ml diluted Nafion solution (5 wt. %, Aldrich) with an ultrasonication probe. The electrolyte was deaerated with high purity argon prior to electrochemical cleaning conducted by running cyclic voltammograms between 0.1 and 1V vs. SHE at a scan rate of 200 mV/s for 100 cycles. Saturation with high purity oxygen was performed prior to the electrocatalytic activity screening. The potentials were controlled with respect to SCE reference electrodes by a Solartron potentiostat. All hydrodynamic polarization measurements were performed under a rotation speed of 2000 rpm and a scan rate of 5 mV/s. The platinum mass specific activity was used for calculating relative activity as compared to a benchmark Pt/C catalyst.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method for preparing a supported platinum and tungsten containing composition comprising:
   providing a platinum-containing carbonyl complex;
   providing a tungsten-containing carbonyl complex;
   first contacting the platinum-containing carbonyl complex and the tungsten-containing carbonyl complex to form a platinum and tungsten-containing complex;
   second contacting the platinum and tungsten-containing complex with a support material to prepare a supported platinum and tungsten containing composition; and
   heating the supported platinum and tungsten containing composition to a temperature sufficient to form a platinum and tungsten alloy, and ranging from about 500° C. to about 800° C. in a reducing atmosphere,
   wherein the supported composition after heating comprises particles with average particle sizes ranging between about 1 and about 4 nanometers.

2. The method according to claim 1, wherein the tungsten-containing carbonyl complex comprises tungsten hexacarbonyl.

3. The method according to claim 1, wherein the contacting of the platinum-containing carbonyl complex and the tungsten-containing carbonyl complex comprises mixing the two carbonyl complexes in an organic solvent.

4. The method according to claim 3, wherein the organic solvent comprises at least one element selected from the group consisting of alcohol, methanol, ethanol and tetrahydrofuran.

5. The method according to claim 1 further comprising purging with CO during the first contacting step.

6. The method according to claim 1, wherein the support material comprises at least one element selected from the group consisting of a high surface area carbon black, an alumina support material and a zirconia support material.

7. The method according to claim 1 further comprising heating the supported composition to a temperature of about 700° C.

8. The method according to claim 1, wherein the particles have average particle sizes ranging between about 1.4 and about 2.8 nanometers.

9. The method according to claim 1, wherein the supported composition comprises platinum present in an atomic percentage ranging between about 20 percent and about 95 percent and tungsten present in an atomic percentage ranging between about 5 percent and about 80 percent.

10. The method according to claim 1, wherein the supported composition comprises platinum present in an atomic percentage ranging between about 30 percent and about 45 percent and tungsten present in an atomic percentage ranging between about 55 percent and about 70 percent.

11. The method according to claim 1, wherein the supported composition comprises the cathode of a fuel cell.

* * * * *